United States Patent
Lee

(10) Patent No.: US 8,341,386 B2
(45) Date of Patent: Dec. 25, 2012

(54) METHOD FOR UPDATING BASIC INPUT/OUTPUT SYSTEM AND METHOD FOR REPAIRING THEREOF

(75) Inventor: Ming-Jen Lee, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 505 days.

(21) Appl. No.: 12/541,975

(22) Filed: Aug. 17, 2009

(65) Prior Publication Data
US 2010/0064127 A1    Mar. 11, 2010

(30) Foreign Application Priority Data
Sep. 5, 2008 (TW) .............................. 97134216 A

(51) Int. Cl.
G06F 9/00    (2006.01)
G06F 11/00   (2006.01)
(52) U.S. Cl. ............................................. 713/1; 714/15
(58) Field of Classification Search .................. 713/1, 2; 714/15
See application file for complete search history.

(56) References Cited

U.S. PATENT DOCUMENTS

| | | | | |
|---|---|---|---|---|
| 5,568,641 A * | 10/1996 | Nelson et al. | ...................... | 713/2 |
| 5,579,522 A * | 11/1996 | Christeson et al. | ............... | 713/2 |
| 6,308,265 B1 * | 10/2001 | Miller | ................ | 713/2 |
| 2003/0126511 A1 * | 7/2003 | Yang et al. | ...................... | 714/39 |
| 2004/0025002 A1 * | 2/2004 | Cepulis et al. | .................... | 713/2 |
| 2004/0044837 A1 * | 3/2004 | Hasbun et al. | ................ | 711/103 |
| 2004/0221147 A1 * | 11/2004 | Tseng et al. | ...................... | 713/1 |
| 2006/0129795 A1 | 6/2006 | Bulusu et al. | | |
| 2009/0240934 A1 * | 9/2009 | Chou | ................ | 713/2 |
| 2009/0265537 A1 * | 10/2009 | Lin | ................ | 713/2 |
| 2009/0271660 A1 * | 10/2009 | Chin et al. | ..................... | 714/15 |

FOREIGN PATENT DOCUMENTS

| | | |
|---|---|---|
| CN | 1526250 | 9/2004 |
| CN | 101206579 | 6/2008 |
| TW | 518514 | 1/2003 |

* cited by examiner

Primary Examiner — Thomas Lee
Assistant Examiner — Phil Nguyen
(74) Attorney, Agent, or Firm — Jianq Chyun IP Office

(57) ABSTRACT

The invention relates to a method for updating a basic input/output system (BIOS) and method for repairing the BIOS. A part of a program code of the BIOS is stored in a backup memory block in advance. If the BIOS fails to update, the backup program code can be adopted to start up a computer system and then the BIOS will be repaired.

9 Claims, 5 Drawing Sheets

METHOD FOR UPDATING BASIC INPUT/OUTPUT SYSTEM AND METHOD FOR REPAIRING THEREOF

CROSS-REFERENCE TO RELATED APPLICATION

This application claims the priority benefit of Taiwan application serial no. 97134216, filed on Sep. 5, 2008. The entirety of the above-mentioned patent application is hereby incorporated by reference herein and made a part of this specification.

BACKGROUND OF THE INVENTION

1. Field of the Invention

The present invention relates to a Basic Input/Output System (hereinafter referred to as "BIOS") and more particularly, to a method for updating and repairing the BIOS.

2. Description of Related Art

A BIOS stored in a flash memory of a motherboard in a current computer system often needs to be updated for reasons such as that it is required to support new hardware or that programming code of the BIOS has errors therein. FIG. 1 is a flowchart illustrating a conventional method of updating BIOS.

Referring to FIG. 1, the method starts with step S100 to update the BIOS with the computer system executing an updating program. The updating program first clears a main BIOS stored in a flash memory in step S110. Next, updated main BIOS is written in the flash memory in step S120. Afterwards, the updating program determines in step S130 whether a boot block of the BIOS has to be updated. If the boot block has to be updated, the boot block in the flash memory is cleared in step S140 and a new boot block is written in the flash memory in step S150. Updating the BIOS is completed in step S160. If in step S130, the updating program determines that it is not required to update the boot block, updating the BIOS is then completed (step S160).

However, during the updating process, the BIOS in the computer system may sometimes be damaged due to update failure caused by computer power outage or system reset. At this point, if the damaged portion belongs to the main BIOS while the boot block remains intact, the user may update the BIOS again through external devices of the computer system.

However, if the damaged portion of the BIOS belongs to the boot block, the BIOS will completely lose functionality and the computer system cannot be booted. When encountering the abovementioned damage to the boot block, the user wishing to remedy the BIOS has to change the flash memory with the damaged BIOS stored thereon to another flash memory with an (undamaged) BIOS in order for the computer system to resume normal operations. The abovementioned approach of replacing the flash memory, however, requires the user to remove the casing of the computer system and put the new flash memory on the motherboard, possibly resulting in damage to the entire memory if the pins of the flash memory are not inserted in the correct positions.

Many manufacturers have so far proposed methods to prevent a computer system from failing to boot due to a BIOS damage. One of the methods is to dispose two flash memories, both containing the BIOS, on the motherboard. Thus, when one of the BIOS's is damaged at update, the user may switch a jumper on the motherboard so that the computer system may use the other BIOS at booting. However, the method results in an increase in the cost and area of the motherboard. In addition, the user has to remove the casing of the computer to switch the jumper. Furthermore, some manufacturers additionally dispose an automatic detection circuit and two flash memories to store the BIOS's. When the automatic detection circuit detects that one of the BIOS's is damaged, operation is automatically switched to the other BIOS so that the computer system may maintain normal operation. However, the method, though, frees the user from having to remove the computer casing but adds a detection circuit and a flash memory to the motherboard, thereby increasing the cost and area of the motherboard.

SUMMARY OF THE INVENTION

The present invention provides a method for updating and repairing a basic input/output system which repairs a damaged BIOS without increasing cost of motherboard. Moreover, a computer system may normally operate regardless of whether the BIOS is intact.

To resolve the aforesaid issue, the present invention provides a method for updating BIOS stored in a non-volatile memory including a first region in which there stores a part of program code of the BIOS. First, a descriptor table storing an address data is read. The address data has an address of the BIOS in the non-volatile memory. The address data at this time points to an original address of the BIOS. Next, the part of the program code in the first region is copied to a backup memory block. Then, the address data in the descriptor table is changed so that the address data points to the backup memory block. Afterwards, the first region is cleared and an updated program code is written in the first region. Finally, the address data in the descriptor table is restored to point to the original address.

In one embodiment of the present invention, the abovementioned part of the program code is program code of a boot block in the BIOS. The abovementioned non-volatile memory further includes a second region used to store a main BIOS of the BIOS. Before copying the program code of the boot block, the second region of the non-volatile memory is first cleared and an updated main BIOS is written in the second region.

The present invention further provides a method for repairing BIOS suitable for a computer system. First, detection is made on whether the computer system is in a descriptor mode. Next, a backup program code of the BIOS is read according to the descriptor mode. Finally, the backup program code is used to start up the computer system and repair the BIOS.

In one embodiment of the present invention, steps of reading the backup program code include: reading a descriptor table in the descriptor mode; obtaining an address of the backup program code from an address data in the descriptor table; and reading the backup program code.

In the present invention, a part of the BIOS program code is backed up so when the BIOS update fails, the computer system may still use the backup part of the BIOS program code to boot and restore the BIOS after booting.

In order to make the aforementioned features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings

DESCRIPTION OF EMBODIMENTS

In a conventional method for updating BIOS, when the BIOS update fails, the computer system may not be able to boot. To prevent the computer system from being unable to boot due to a BIOS update failure, the present invention provides a method for updating and repairing BIOS to free a user from having to worry about a BIOS update failure.

Figure 1:
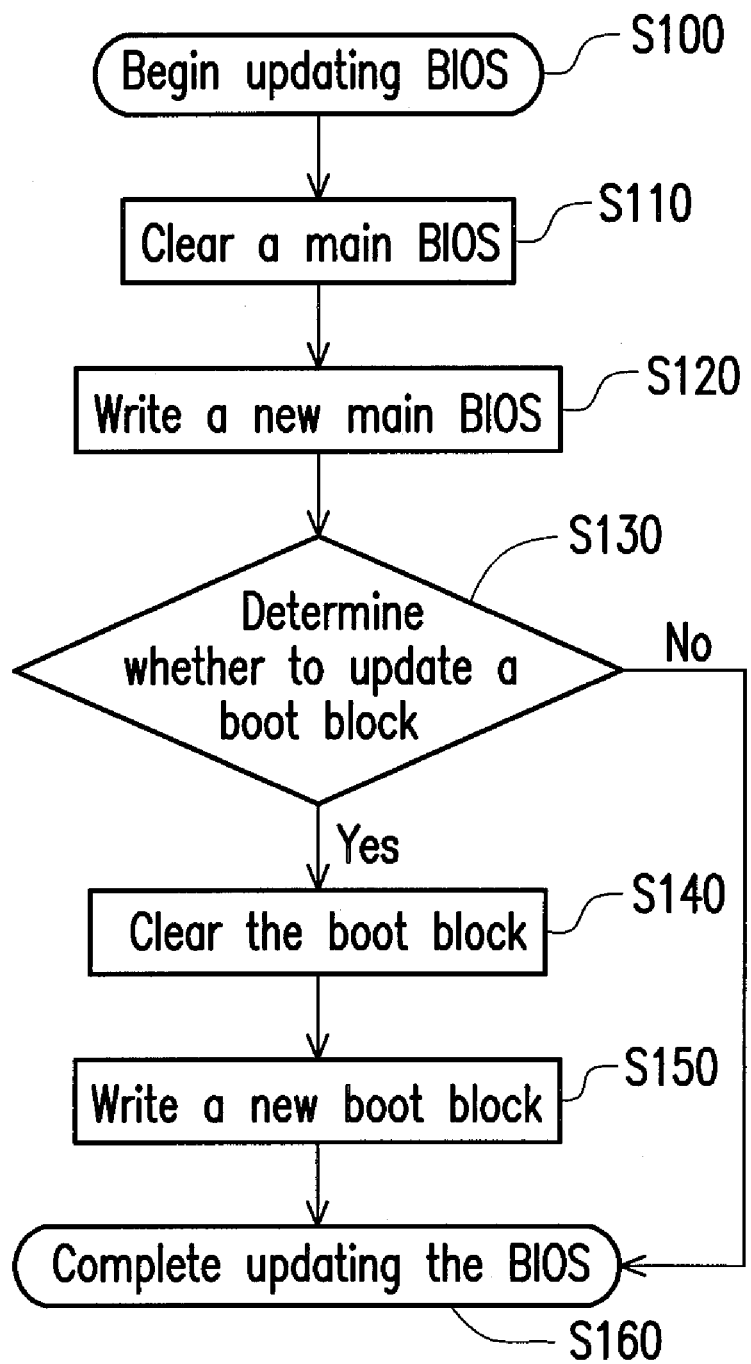
FIG. 1 is a flowchart illustrating a conventional method for updating BIOS.
Figure 2:
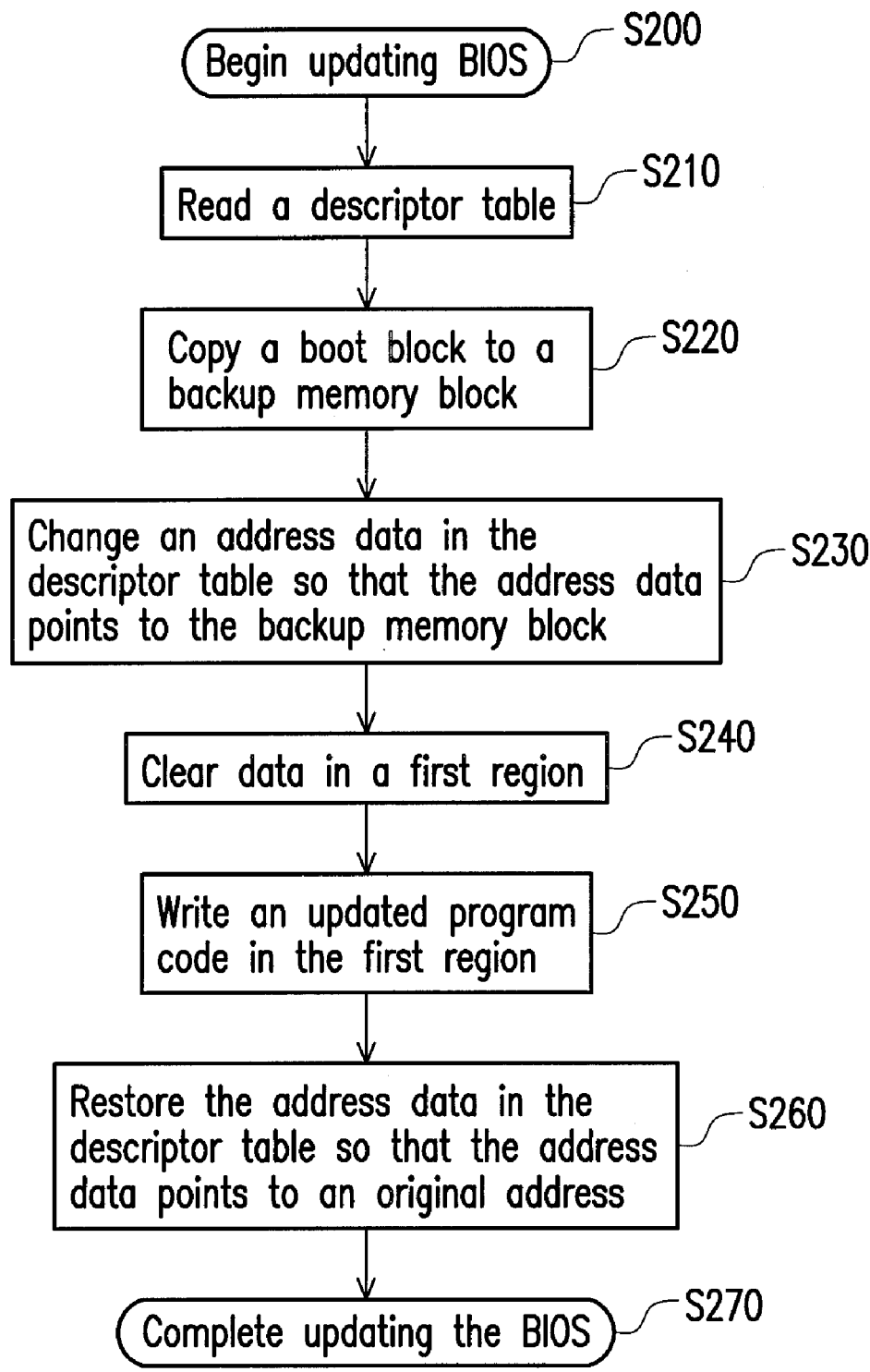
FIG. 2 is a flowchart illustrating a method of updating BIOS according to an embodiment of the present invention.

FIG. 2 is a flowchart illustrating a method of updating BIOS according to an embodiment of the present invention. For the purpose of illustrating the present embodiment, the method for updating BIOS of the present embodiment is assumed to be applied in a current computer system, in which the BIOS is stored in a non-volatile memory on the motherboard, for example. Take the current computer system as an example, the non-volatile memory is a flash memory, for instance. Furthermore, the non-volatile memory in the present embodiment is assumed to have a first region used to store a part of the BIOS program code. In addition, in the present embodiment, the part of the BIOS program code stored in the first region is assumed to be a boot block in the BIOS. However, persons having ordinary skill in the art should appreciate that the abovementioned assumptions are not to be used to limit the present invention.

Referring to FIG. 2, updating the BIOS begins with step S200. First, in the computer system, a descriptor table is read in step S210. The descriptor table in the present embodiment stores an address data which is obtained when the descriptor table is read. The address data points to an address of the BIOS in the non-volatile memory. In the present embodiment, the address of the BIOS may be an initial position of the BIOS, a highest address or lowest address in the flash memory. Moreover, at this time, the address data in the descriptor table points to an original address of the BIOS in the non-volatile memory.

Next, the boot block of the BIOS stored in the first region of the non-volatile memory is to be copied to a backup memory block in step S220. The backup memory block may be a block in the abovementioned non-volatile memory and may also be an arbitrary memory block at other positions on the motherboard.

Next, the address data in the descriptor table is to be changed to point to the abovementioned backup memory block in step S230. Then, data in the first region of the non-volatile memory is to be cleared in step S240. An updated program code is to be written to the first region in step S250 to update the boot block in the BIOS. The updated program code may be obtained through other peripheral devices of the computer system (e.g. a floppy disk drive, USB storage medium, and an optical disk drive) or may be pre-downloaded from a network to a hard disk of the computer system. Finally, the address dada in the descriptor table is to be restored to point to the original address of the original BIOS in step S260. Updating the BIOS completes in step S270.

Figure 3:
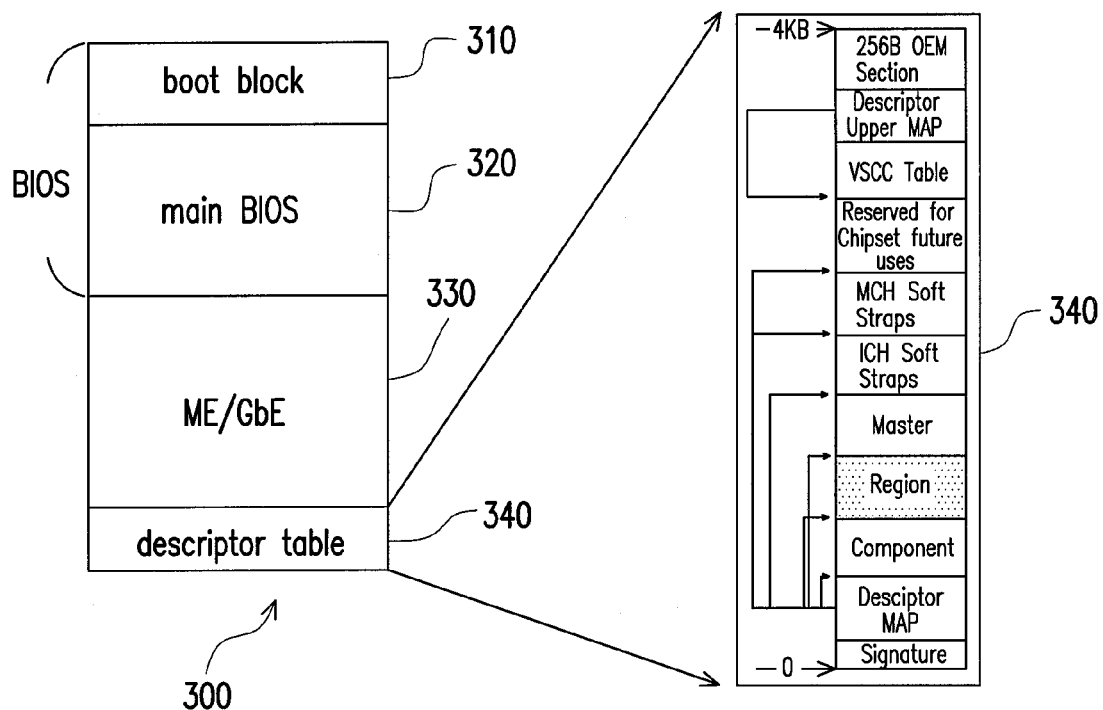
FIG. 3 is a schematic diagram illustrating block configuration of a flash memory in a current motherboard.

In the current computer technology, Intel has proposed a technique of a descriptor mode which mainly divides a flash memory on the motherboard into multiple regions and allows a plurality of elements on the motherboard to share the flash memory while only respectively accessing corresponding blocks in the flash memory. Take the flash memory on the current motherboard as an example; configuration of memory division thereof is as shown in FIG. 3. Referring to FIG. 3, a flash memory 300 includes four blocks 310~340. The block 310 stores a boot block of BIOS, the block 320 stores a main BIOS of the BIOS, the block 330 stores a program code of a management engine (ME) or a gigabit Ethernet network (GbE), and the block 340 stores a descriptor table. The descriptor table in the block 340 includes a plurality of sections, each of which respectively has different data. Part of data in the region is used to define each of the blocks of the flash memory and to record an initial address and length of each block.

Take a current computer system which supports the descriptor mode. When the computer system starts up, a computer chip first reads the descriptor table in the flash memory and obtains an address of the BIOS in a region portion of the descriptor table. The computer chip is a south bridge chip, for example. A chip integrating a south bridge chip and a north bridge chip is also a feasible embodiment, which is not limited by the present invention herein. After obtaining the address of the BIOS, a central processor begins to execute the BIOS program code so that the computer system may enter a start-up process. Therefore, when the BIOS update fails, the boot block or the main BIOS of the BIOS may be damaged such that the computer system is not able to execute the boot block, resulting in the computer system's failure to normally start up.

Figure 4:
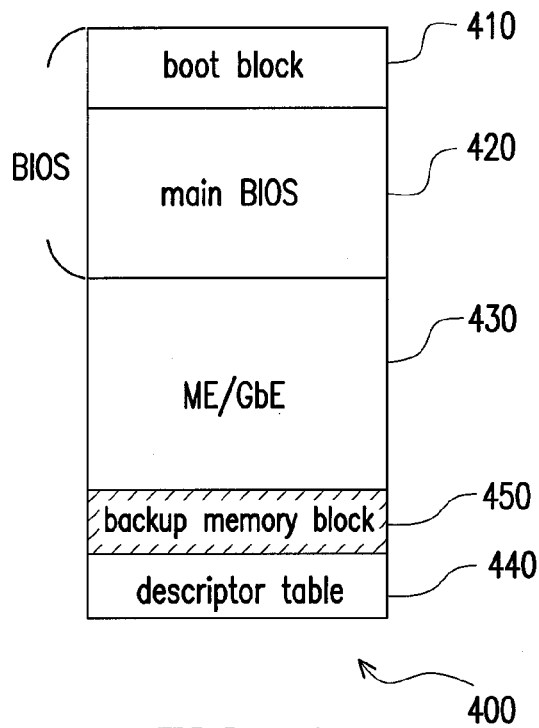
FIG. 4 is a schematic diagram illustrating block configuration of a flash memory according to an embodiment of the present invention.

A new backup memory block may be additionally defined in, for example the flash memory, in the present embodiment. The new backup memory block is to be regarded as a backup memory block and used to store a backup boot block. In addition, configuration of division of the flash memory is as shown in FIG. 4. Blocks 410~440 are identical to the blocks 310~340 in FIG. 3. A block 450 is a backup memory block of the present embodiment. During the process of updating BIOS in the present embodiment, after a boot block 410 of the original BIOS is copied to the backup memory block 450, BIOS address recorded in a region portion of a descriptor table 440 is to be changed to point to the backup memory block 450. The BIOS address recorded in the region portion of the descriptor table 440 is to be restored to point to the original boot block 410 after the BIOS update completes.

In the above embodiment, although only the boot block of the BIOS is copied to the backup memory block, persons having ordinary skill in the art should appreciate that the entire BIOS (e.g. the boot block and the main BIOS) may be copied to the backup memory block.

It should be noted that the above embodiment has depicted a possible mode for updating BIOS. However, persons skilled in the art should realize that design methods applied in various computer systems are distinct. Hence, the application of the present invention is not to be limited to the possible mode described herein. In other words, any method involving changing an address data in a descriptor table to dynamically point to a backup memory block and then performing updating a part of a BIOS program code falls within the spirit of the present invention.

In light of the method for updating the BIOS in the above embodiment, a computer system may still use data in the backup memory block to boot in the case of a BIOS update failure. Therefore, in the above embodiment, after the boot block of the first region is cleared in step S240 above, the boot block will be damaged under the circumstances when the computer system is powered off or reset. The following illustrates how to repair the BIOS in the present embodiment.

Figure 5:
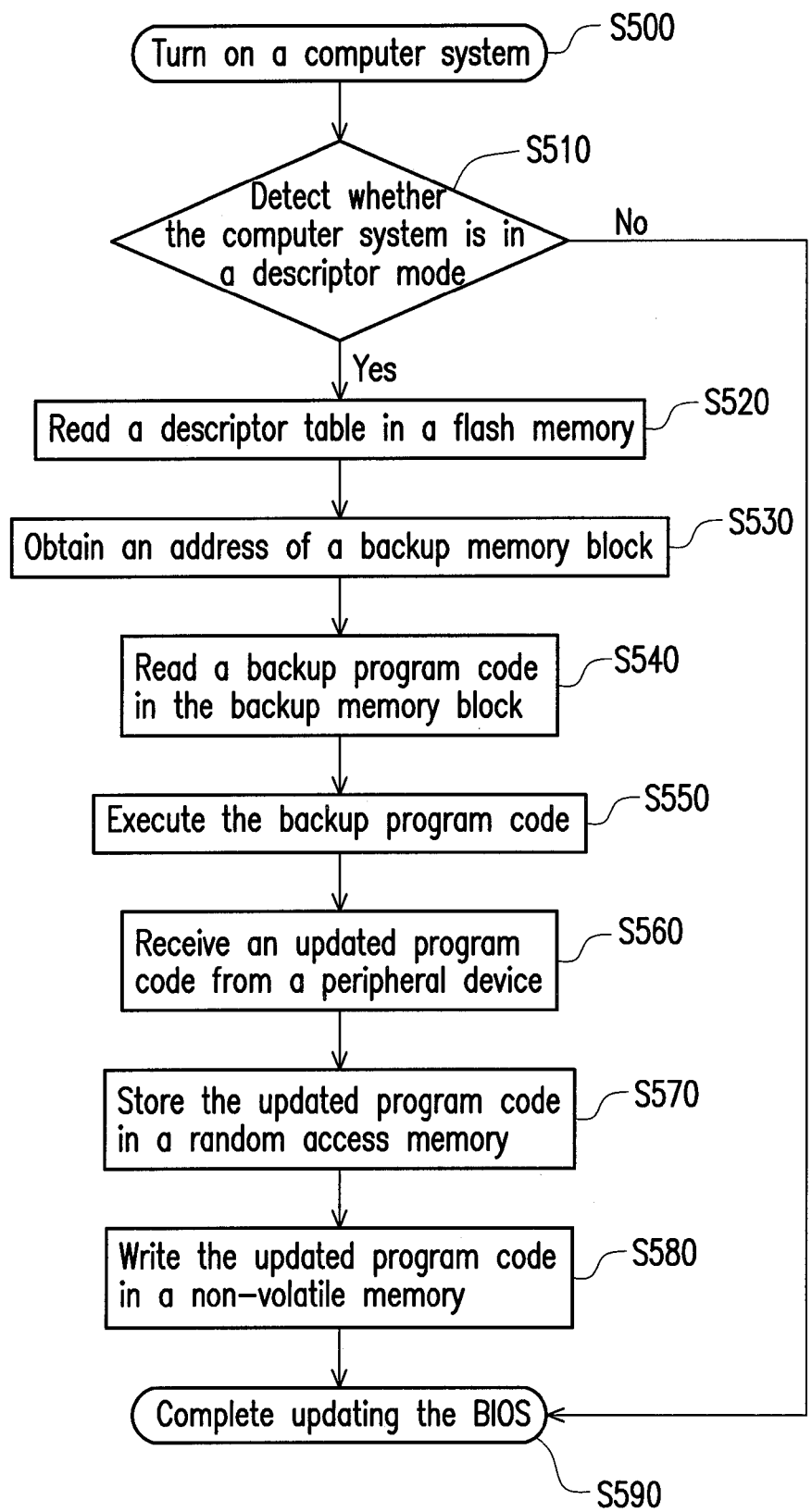
FIG. 5 is a flowchart illustrating a method for repairing BIOS according to an embodiment of the present invention.

FIG. 5 is a flowchart illustrating a method of repairing BIOS according to an embodiment of the present invention. Referring to FIG. 5, a computer system is turned on in step S500. Next, a computer chip of the computer system first detects whether the computer system is in a descriptor mode in step S510. If the computer system is detected to be in a descriptor mode, the computer chip first reads a descriptor table in a flash memory in step S520 and obtains an address of a backup memory block from an address data in the descriptor table in step S530. From the method for updating BIOS in the above embodiment, the address data in the descriptor table points to the backup memory block before the BIOS update completes.

Then, a backup program code in the backup memory block are read in step S540 and executed to start up the computer system in step S550. The backup program codes are a boot block of the BIOS, for example. Thus, some elements in the computer system (e.g. a floppy disk drive, a USB interface, and a random access memory) have been initialized after the computer system completes executing the boot block. The elements may then normally operate. The computer system then receives an updated program code from a peripheral device (e.g. a floppy disk drive or a USB storage medium) in step S560, stores the updated program code in a random access memory in step S570, and then writes the updated program code in a non-volatile memory in step S580 so as to complete repairing the BIOS in step S590. The abovementioned updated program code may be an entire BIOS program code and may also only include a program code of a main BIOS or a boot block.

In order for those having ordinary skill in the art to implement the present invention through the teachings of the present embodiment, yet another embodiment of the method for updating BIOS is illustrated below.

Figure 6:
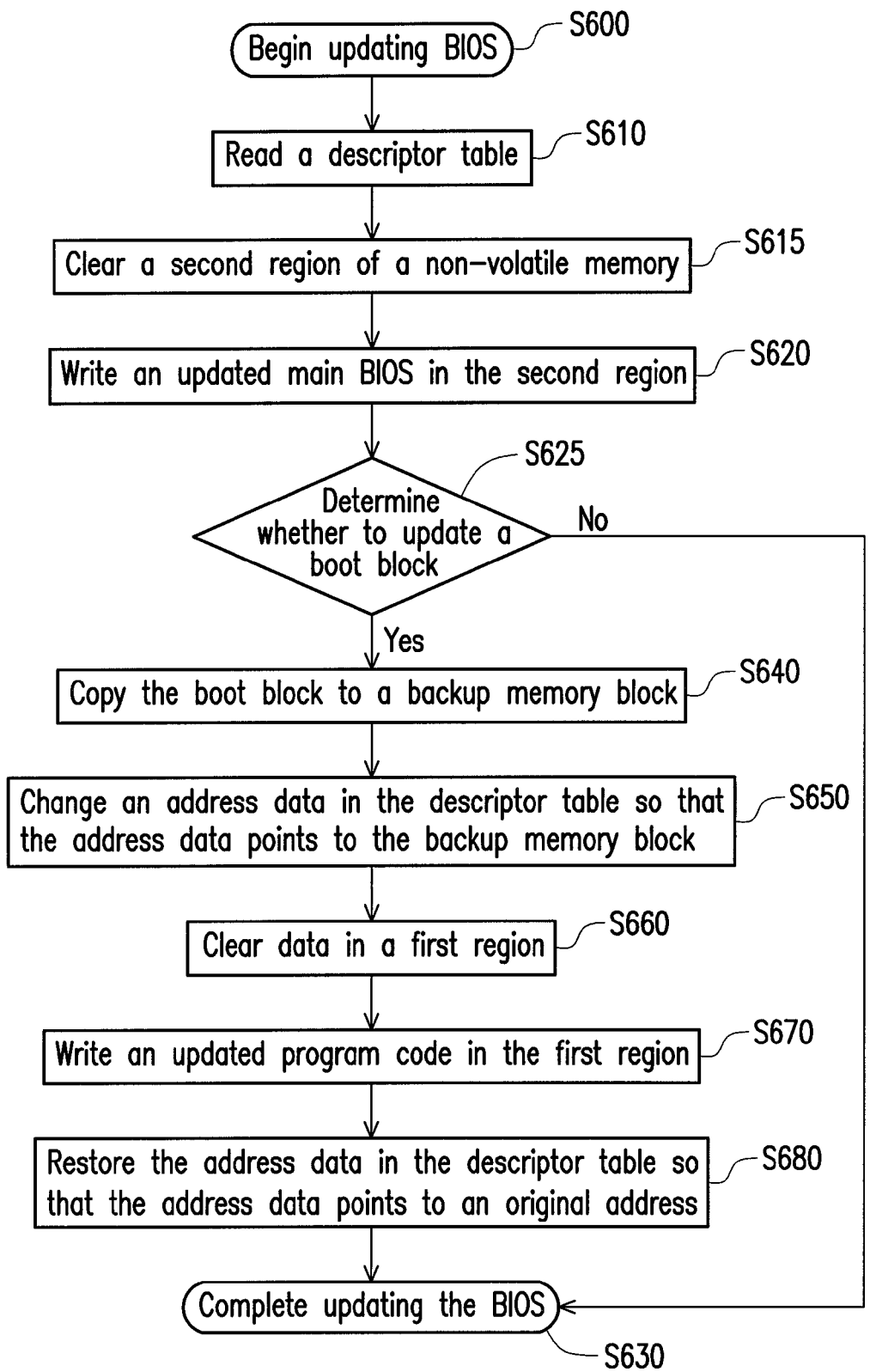
FIG. 6 is a flowchart illustrating a method for repairing BIOS according to another embodiment of the present invention.

FIG. 6 is a flowchart illustrating a method for updating BIOS according to another embodiment of the present invention. Before illustrating the present embodiment, the present embodiment is assumed to be in the same condition as FIG. 2 above and the BIOS is assumed to be stored in a flash memory as shown in FIG. 4, for example. Referring to both FIG. 4 and FIG. 6, updating the BIOS begins in step S600. First, a descriptor table 440 is read through a computer chip of a computer system in step S610 to obtain an address of the BIOS in a non-volatile memory. Next, a second region of the non-volatile memory is cleared in step S615. The second region is the block 420 in FIG. 4, for example. Then, updated main BIOS is written in the second region in step S620. Here, the updated main BIOS is obtained from peripheral devices of the computer system (e.g. a floppy disk drive, a USB storage medium, and an optical disk drive).

Next, a determination is made on whether the computer system is to update a boot block in step S625. If the computer system is not to update the boot block, updating the BIOS ends in step S630. When the computer system determines that the boot block is to be updated, the BIOS boot block stored in the first region (i.e. the block 410 in the flash memory) is to be copied to the backup memory block 450 in step S640. Next, an address data in the descriptor table is to be changed to point to the abovementioned backup memory block 450 in step S650. Then, data in the block 410 is to be cleared in step S660. In addition, an updated program code is written in the block 410 in step S670 to update the boot block in the BIOS. Finally, the address dada in the descriptor table is to be restored to point to an original address of the original BIOS in step S680. Updating the BIOS completes in step S630.

In summary, in the present invention, a part of the BIOS program code is backed up in a backup memory block so when the BIOS update fails, the computer system may still use the backed up part of the BIOS program code to boot and then repair the BIOS after booting.

It will be apparent to those of ordinary skills in the technical field that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A method for updating a basic input/output system (BIOS) of a computer system, the BIOS being stored in a non-volatile memory comprising a plurality of blocks, wherein the blocks comprise a first block used to store a part of program code of the BIOS, and a third block used to store a descriptor table comprising a plurality of sections, wherein an initial address and a length of each of the blocks are stored in a region section of the sections, the method comprising:
   reading the region section of the descriptor table to obtain an address data used to point to an address of the BIOS in the non-volatile memory;
   copying the part of the program code from the first block to a backup memory block of the blocks;
   changing the address data in the region section of the descriptor table so that the address data points to the backup memory block;
   clearing the first block;
   writing an updated program code in the first block;
   restoring the address data in the region section of the descriptor table so that the address data points to the first block;
   when the computer system is turned on, detecting if the computer system is in a descriptor mode; and
   repairing the BIOS according to the descriptor table if the computer system is in the descriptor mode.

2. The method for updating the BIOS according to claim 1, wherein the blocks of non-volatile memory further comprises a second block used to store a main BIOS of the BIOS.

3. The method for updating the BIOS according to claim 2, further comprising the following before copying the part of the program code in the first block to the backup memory block:
   clearing the second block in the non-volatile memory; and
   writing an updated main BIOS in the second block.

4. The method for updating the BIOS according to claim 3, wherein the part of the program code is a program code of a boot block in the BIOS.

5. The method for updating the BIOS according to claim 4, further comprising the following after writing the updated main BIOS to the second block:
   determining whether to update the boot block in the BIOS; and
   performing the updating steps if it is determined to update the boot block in the BIOS.

6. The method for updating the BIOS according to claim 1, further comprises:

copying all program code of the BIOS to the backup memory block.

7. The method for updating the BIOS according to claim 1, wherein the step of reading the region section of the descriptor table to obtain the address data, further comprises:
reading the descriptor table through a computer chip.

8. The method for updating the BIOS according to claim 1, further comprising:

receiving the updated program code from a peripheral device; and storing the updated program code in a random access memory.

9. The method for updating the BIOS according to claim 1, wherein the non-volatile memory is a flash memory.

* * * * *